(12) United States Patent
Abrand et al.

(10) Patent No.: US 9,080,442 B2
(45) Date of Patent: Jul. 14, 2015

(54) MODULAR DEVICE FOR LIQUID/LIQUID GRAVITY SEPARATION

(75) Inventors: Stéphanie Abrand, Neauphle le Chateau (FR); Raymond Hallot, Voisins le Bretonneux (FR); Nicolas Butin, Montigny le Bretonneux (FR)

(73) Assignee: Saipem S.A., Montigny le Bretonneux (FR)

(*) Notice: Subject to any disclaimer, the term of this patent is extended or adjusted under 35 U.S.C. 154(b) by 250 days.

(21) Appl. No.: 13/805,516

(22) PCT Filed: May 19, 2011

(86) PCT No.: PCT/FR2011/051128
§ 371 (c)(1),
(2), (4) Date: Dec. 19, 2012

(87) PCT Pub. No.: WO2011/161343
PCT Pub. Date: Dec. 19, 2011

(65) Prior Publication Data
US 2013/0092633 A1 Apr. 18, 2013

(30) Foreign Application Priority Data
Jun. 23, 2010 (FR) ...................................... 10 54979

(51) Int. Cl.
*B01D 17/025* (2006.01)
*E21B 43/36* (2006.01)
(Continued)

(52) U.S. Cl.
CPC ............ *E21B 43/36* (2013.01); *B01D 17/0208* (2013.01); *B01D 17/0214* (2013.01); *E02D 29/06* (2013.01)

(58) Field of Classification Search
CPC  B01D 17/0208; B01D 17/0214; E21B 43/34; E21B 43/36
USPC ......... 210/747.1, 801, 170.01, 232, 253, 519, 210/532.1, 533, 538, 539, 540; 95/253; 96/182, 184; 166/357, 267, 75.12; 405/224
See application file for complete search history.

(56) References Cited

U.S. PATENT DOCUMENTS 1,467,512 A * 9/1923 Starke ............................. 96/204
1,482,688 A    2/1924 Kygar
(Continued)

FOREIGN PATENT DOCUMENTS

FR        2921844       4/2009
WO   WO2007/071664     6/2007
WO   WO2009/108063     9/2009

*Primary Examiner* — Christopher Upton
(74) *Attorney, Agent, or Firm* — Cozen O'Connor

(57) ABSTRACT

A modular liquid/liquid gravity separation device for separating the aqueous phase and the oil phase of a crude oil at the sea bottom. The device has a plurality of separation modules coupled to a common manifold device. Each separation module has a fluid delivery pipe coupled to at least one gravity separation pipe by a tubular bend device. The common manifold device has a first tank fed with crude oil by a feed pipe resting on the sea bottom via a first inlet orifice, a plurality of first outlet orifices feeding crude oil to said delivery pipes. The aqueous and oil phases are separated within the separation pipes before being delivered into a second tank via second inlet orifices of the second tank to which the separation pipes are coupled. The oil phase is conveyed to the surface from the second tank via a first removal pipe. The aqueous phase is conveyed to the sea bottom.

21 Claims, 6 Drawing Sheets

(51) Int. Cl.
*B01D 17/02* (2006.01)
*E02D 29/09* (2006.01)

(56) References Cited

U.S. PATENT DOCUMENTS

| | | | |
|---|---|---|---|
| 1,516,132 A * | 11/1924 | Allen et al. | 210/109 |
| 1,559,115 A * | 10/1925 | Marker et al. | 96/184 |
| 1,939,988 A * | 12/1933 | Knoles | 210/537 |
| 2,224,345 A * | 12/1940 | Heathman et al. | 210/540 |
| 2,423,793 A | 7/1947 | Olivo et al. | |
| 2,710,071 A * | 6/1955 | Kinser et al. | 96/184 |
| 4,661,127 A * | 4/1987 | Huntley | 96/184 |
| 4,708,793 A * | 11/1987 | Cathriner et al. | 210/539 |
| 7,429,332 B2 * | 9/2008 | Surjaatmadja et al. | 210/170.01 |
| 7,611,635 B2 * | 11/2009 | Chieng et al. | 96/184 |
| 2006/0162553 A1 * | 7/2006 | Esparza et al. | 95/43 |

\* cited by examiner

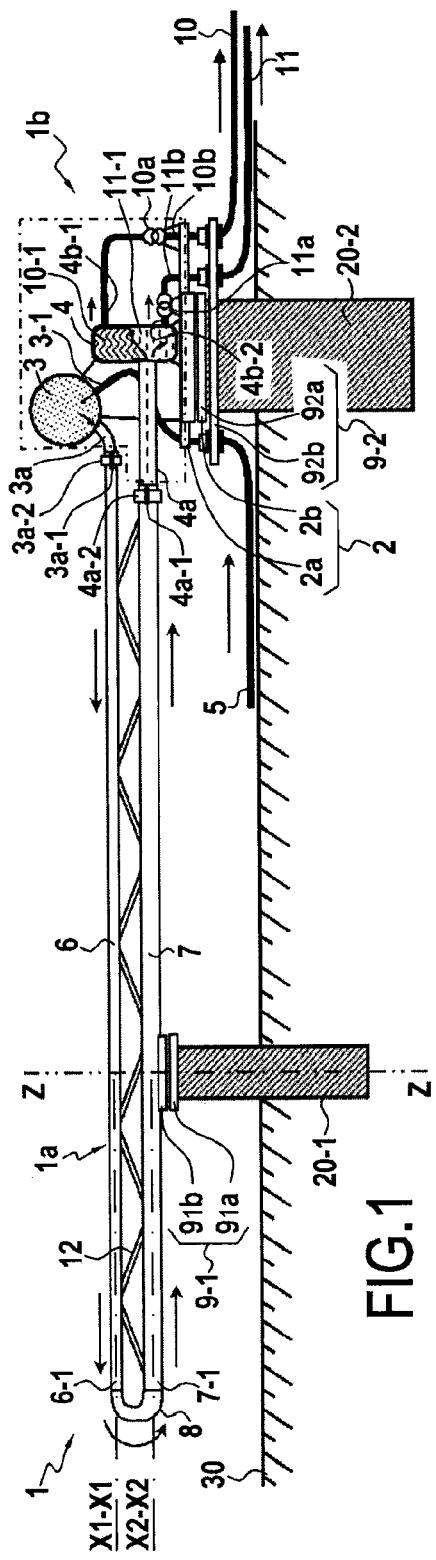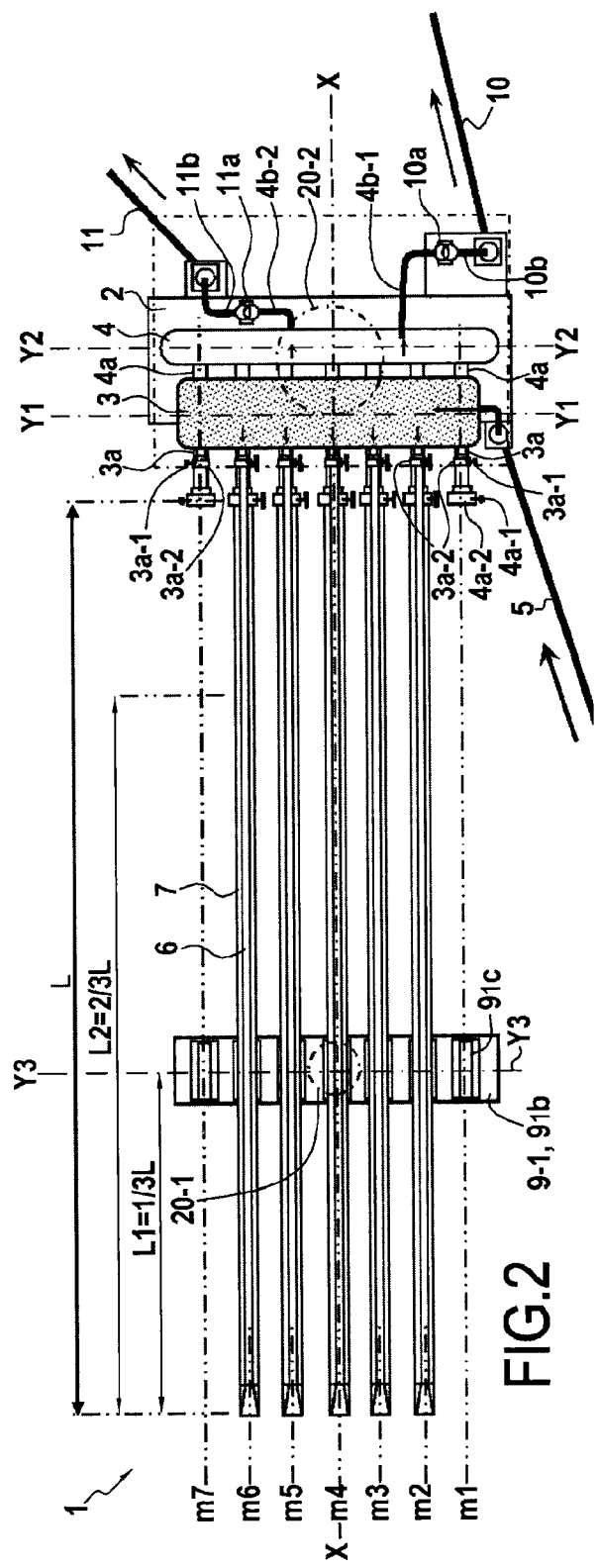

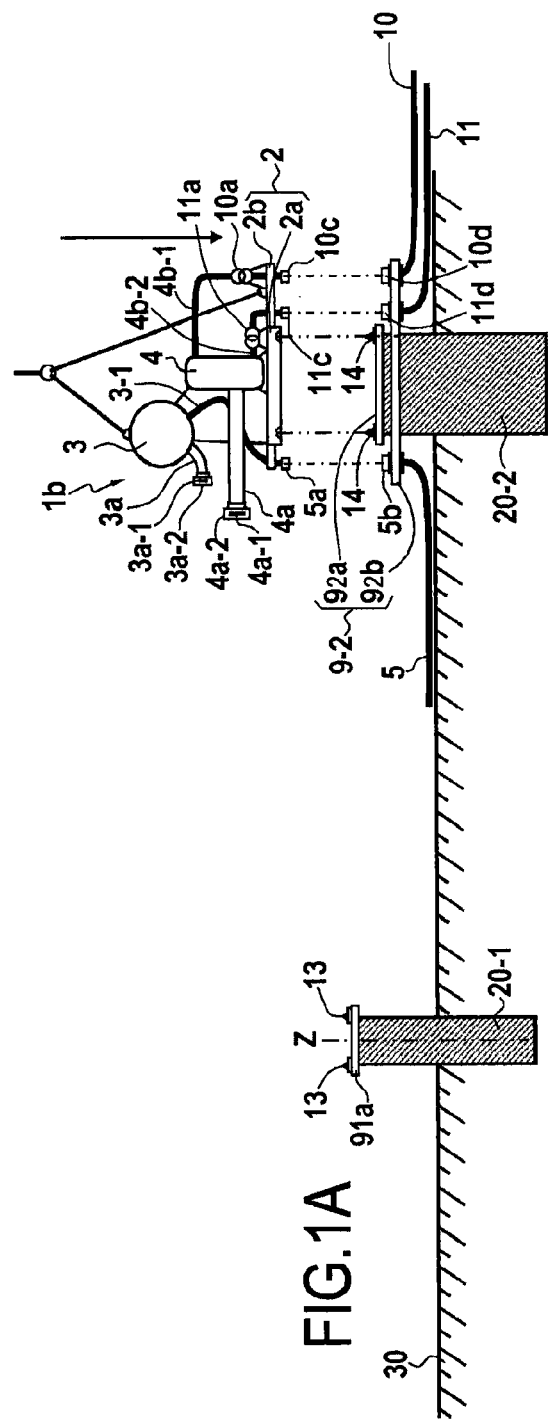
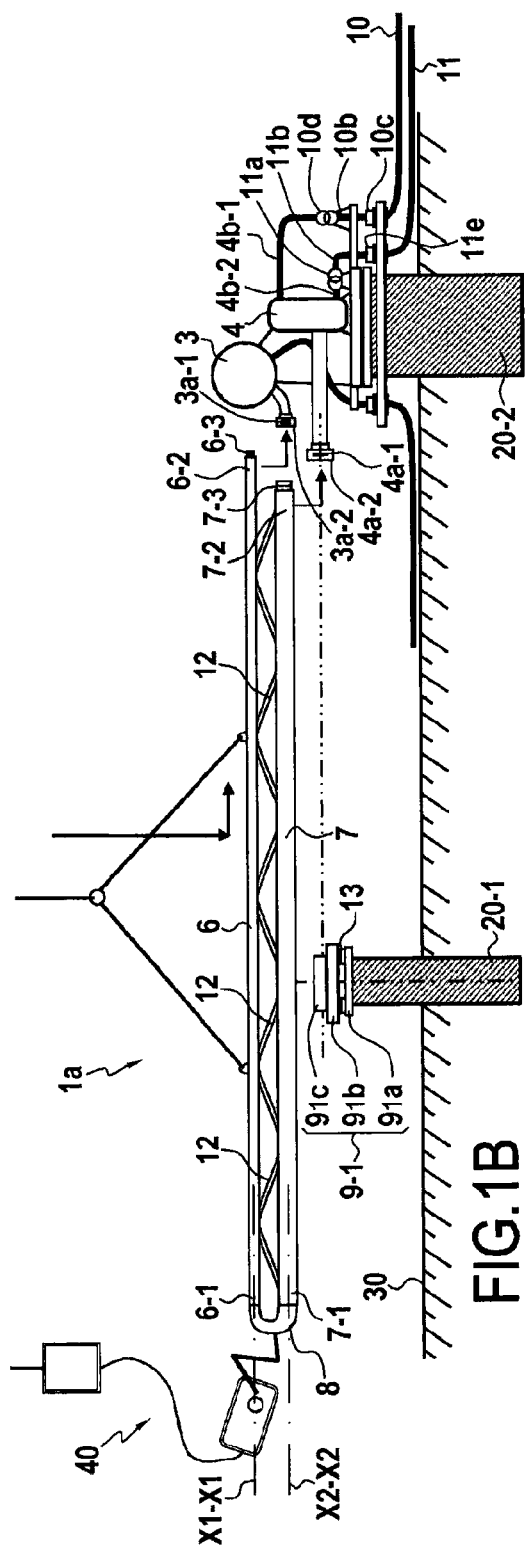

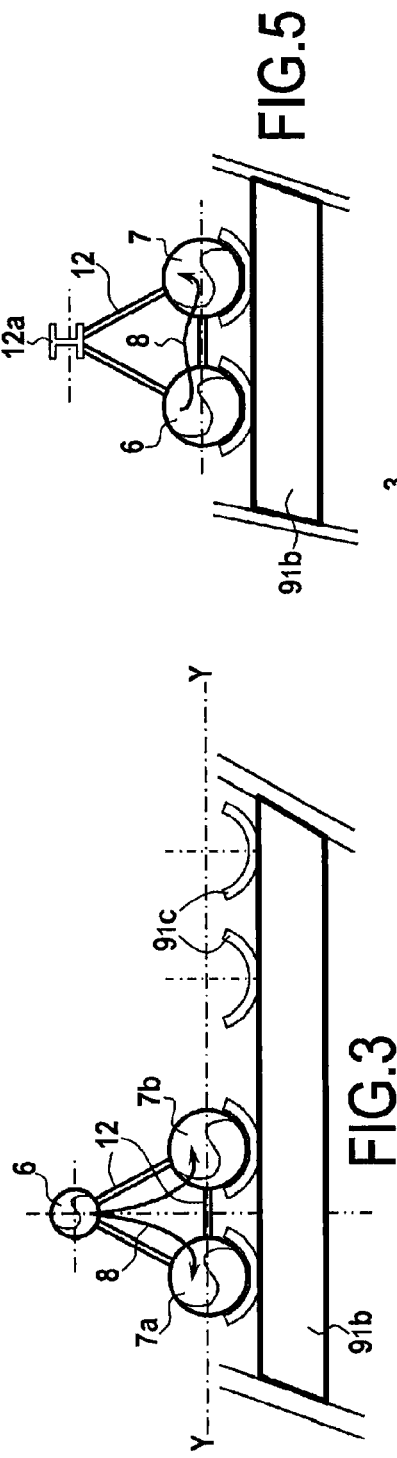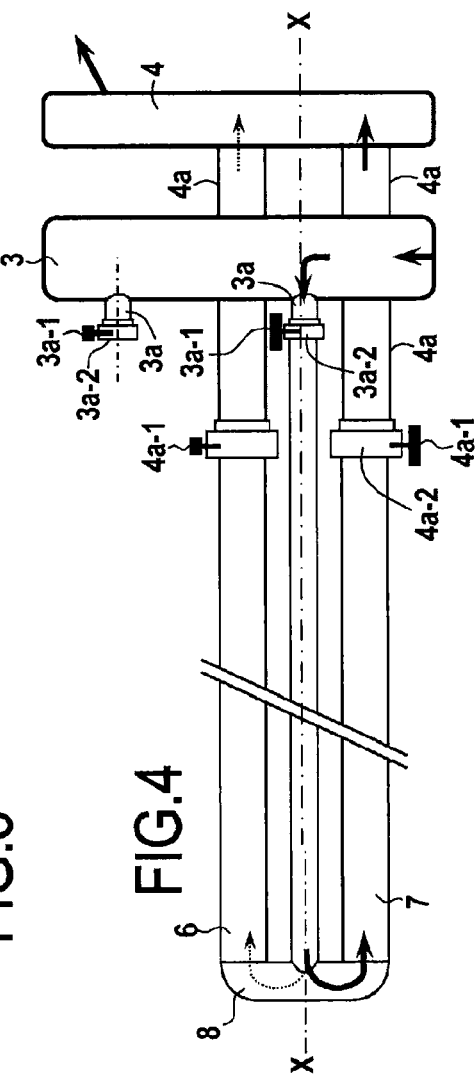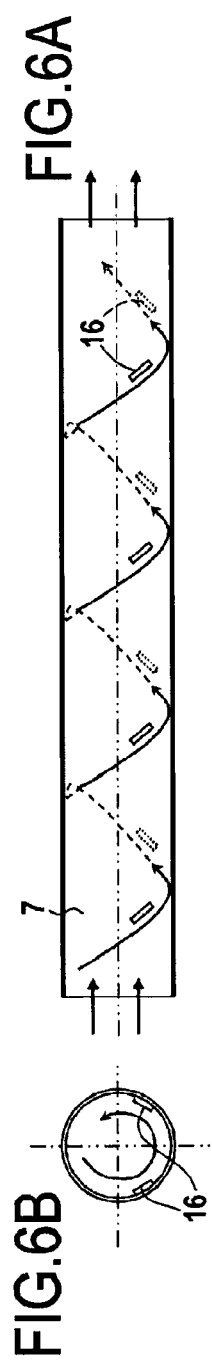

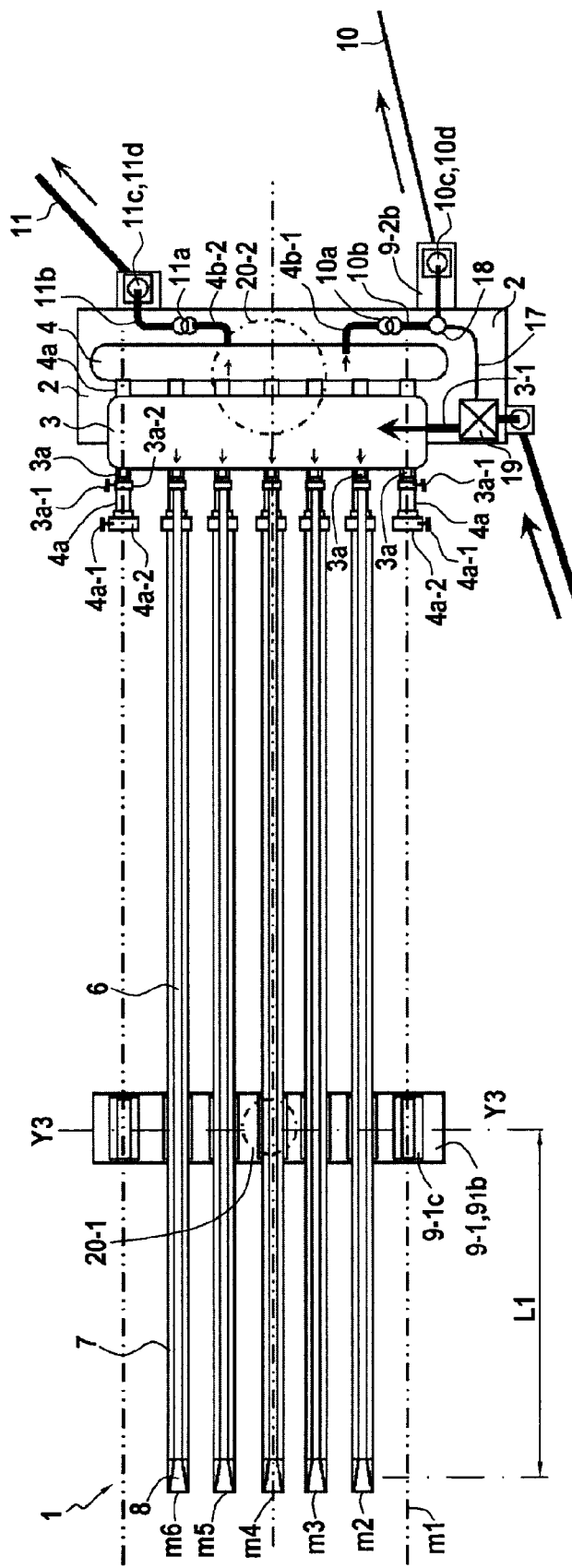

MODULAR DEVICE FOR LIQUID/LIQUID GRAVITY SEPARATION

RELATED APPLICATION

This is a U.S. national stage of application No. PCT/FR2011/051128, filed on May 19, 2011. Priority is claimed on the following application: French Application No.: 1054979 filed on Jun. 23, 2010, the disclosure contents of which is incorporated here by reference.

FIELD OF THE INVENTION

The present invention relates to a horizontal type liquid/liquid separator, and also to a gravity separation method for separating different-density liquid phases of a fluid, in particular the oil and aqueous phases of a crude oil.

The technical field of the invention is thus more particularly the field of oil production, and more particularly the field of oilfields at sea and at great depths.

BACKGROUND OF THE INVENTION

Deep sea oil production is generally performed from a floating support anchored close to oil wells situated in the sea bottom, i.e. at depths lying in the range 1000 meters (m) to 2500 m, or even more. The floating support generally comprises anchor means enabling it to remain in position in spite of the effects of currents, winds, and swell. It also generally includes means for storing and treating oil together with means for off-loading to off-loading tankers, which tankers call at regular intervals in order to off-load the production. These floating supports are commonly referred to as floating production storage off-loading (FPSO) units, with the acronym FPSO being used throughout the description below.

The well heads are generally connected to said FPSO by undersea pipes that are either of the steel catenary riser (SCR) type, or else of the hybrid tower type, comprising:

a vertical riser having its bottom end anchored to the sea bottom and connected to a said pipe resting on the sea bottom, and its top end tensioned by a float immersed in the subsurface, to which float the top end is connected; and a connection pipe, generally a flexible connection pipe or "hose" between the top end of said riser and a floating support on the surface, said connection hose possibly presenting, under the effect of its own weight, a shape in the form of a dipping catenary, i.e. it dips well below the float before subsequently rising to said floating support.

The entire crude oil production is thus generally raised to the FPSO, where it is treated in order to separate the oil proper from the water, the gas, and any sandy components. Once separated, the oil is stored on board, the gas is washed and then delivered to the gas turbines in order to produce the electricity and heat required on board, with any surplus gas being reinjected into the oilfield reservoir in order to raise the pressure in said reservoir. After being freed of any sand in suspension, the water is finally either dumped in the sea after thorough extraction of all particles of oil, or else it is likewise reinjected into the reservoir, with additional sea water taken from the subsurface generally being added in order to achieve the flow rate required for injecting water into the reservoir. The extracted sand, comprising quantities that are minimal in terms of weight, is finally washed and then dumped into the sea.

One method of separating the water and the oil contained in a crude oil that is commonly used on stationary installations on land consists in using tanks of very large volume, generally in the form of elongate cylinders, with the crude oil entering at one end and traveling along a said tank for a duration of about 5 minutes (min) to 10 min, which is long enough for the various phases to separate naturally under gravity by the time they reach the other end. That type of separator is referred to below as a "gravity" separator, and it is generally used for crude oil that also contains gas, with the gas then being recovered from the top portion of the tank, the water and the sand from the bottom portion, and the oil from an intermediate portion. A very wide variety of separators of this type are in existence, and in general they incorporate additional internal devices such as horizontal, vertical, or sloping screens, for the purposes of facilitating separation of the phases and of preventing them from re-mixing at a later stage.

Those separators operate at low pressure, e.g. a pressure lying in the range 3 bars to 10 bars, and sometimes even at less than atmosphere pressure, in order to optimize the degassing of the crude oil. A separator of that type may have a diameter lying in the range 3 m to 4 m and a length lying in the range 15 m to 20 m. This comes from the fact that the transit time must be long enough for the particles of oil situated in the low portion of the separator to have time to rise towards the oil layer situated in the high portion, and similarly for the particles of water situated in the high portion of the separator to have time to move down into the layer of water situated in the low portion of said separator. Thus, the vertical travel time of a particle is very long because of the height of the tank, i.e. because of the diameter of said separator.

In the development of oilfields and after they have been in operation for a few years, it often happens that multiple small discoveries of oil situated in a range of 15 kilometers (km) to 30 km from said FPSO do not in themselves justify installing a new FPSO, and as a result it is desirable to redirect the production from those new wells to an existing FPSO. However, on board said FPSO, the equipment for treating oil is generally being used to full capacity, i.e. at 80% to 90% capacity, and is therefore not capable of treating all of the additional oil coming from remote satellite wells. However, there is enough treatment capacity for such connection providing some of the treatment is performed close to the satellite wells and only pre-treated oil is sent to the surface on board the FPSO for additional treatment prior to being off-loaded. The desired pre-treatment is firstly partial degassing of the crude, with the gas then being reinjected directly in situ into specific wells, followed by water-oil separation, with the water then being treated in specific separators such as cyclones, e.g. a cyclone device as described in patent EP 1 951 434 in the name of the Applicant, in order to reach a level of purity, i.e. an absence of particles of oil, that make it possible either to reinject the oil into a specific local well in order to maintain pressure in the oil reservoir, or else to reinject it directly into the sea. By proceeding in this way, the oil that is sent to the FPSO on the surface has only a remainder of gas and a remainder of water that said FPSO is in a position to treat under good conditions.

It is therefore advantageous to provide liquid/liquid separation devices that are installed on the sea bottom so as to raise to the surface only the oil phase and not the aqueous phase, which may be reinjected into another well at the sea bottom.

If it is desired to install the above-described type of horizontal liquid/liquid gravity separator at the sea bottom, the tank must be capable of withstanding implosion under the effect of the pressure which is substantially 100 bars, i.e. substantially 100 megapascals (MPa), per 1000 m of water depth. Thus, transposing a tank of such a diameter for use at great or very great depth requires wall thicknesses of the order of 100 millimeters (mm) to 250 mm in order to withstand implosion, and such boiler work elements would be very difficult and very expensive to make and install on the sea bottom at great depth.

However, reducing the diameter and the wall thickness of the separator to diameters and thicknesses that are standard for standard undersea pipes would require its length to be increased in order to be capable of separating a sufficient quantity of fluid within the separator. Nevertheless, it is not possible to use separation pipes of excessive length, since there is a danger of creating head loss differentials between the oil and aqueous phases of the crude oil, and that could lead to disturbances to the operation of the separator.

In WO 2007/054651 in the name of the Applicant, a liquid/liquid separation device is described that is suitable for installing on the sea bottom, that device being of the "cyclone" type, making use of centrifugal force, in contrast to the above-described gravity horizontal separators that make use of the force of gravity for performing separation. However implementing cyclone type separators on the sea bottom is difficult because they present an operating point that can accommodate little variation in the water/oil and the liquid/solid ratios.

The term "operating point" is used herein to mean a point at which volumes of different-density phases can be separated in stable manner within the cyclone.

Unfortunately, another major problem in any oilfield development comes from the fact that over the lifetime of an oilfield, the volume of gas relative to a cubic meter ($m^3$) of crude oil ("gas-oil ratio" or GOR) and also the percentage of water ("water cut") varies to a very considerable extent and rarely in predictable manner over the period of 20 years to 30 years, or longer, that the separators are in use. In general, the water cut increases up to about 80% to 90% or even more, and it is practically impossible to connect such a well directly to an FPSO that is already at its capacity limit, and such a connection would in general not be profitable.

A problem on which the present invention is based is thus providing a liquid/liquid separator that makes it possible firstly to treat increasing quantities of crude oil over the lifetime of the installation, i.e., as appropriate, oil from additional wells, and secondly to treat crude in which the variations over time in the flow rate of the crude leaving the well and/or the variations of the proportion of water within the crude for treating make it necessary to be able to redefine the operating parameters of the separator and/or to modify the actual structure of the separator during its lifetime in terms of length, of diameter, and of the flow rate of fluid traveling therethrough.

SUMMARY OF THE INVENTION

An object of the present invention is to provide a horizontal type liquid/liquid separation device, i.e. a device operating by gravity, that is capable of treating crude oil that has been degassed fully or in part, that is suitable for being installed and for operating at the sea bottom at great depth, in particular at a depth of at least 1000 m, that is simpler and less expensive to make, install, and use at the sea bottom, and that provides a solution to the problem of adapting and modifying the operating conditions and/or the structure of the separator during the lifetime of the separator, as described above.

The present invention thus also seeks to provide an improved liquid/liquid separation device that solves the above-mentioned problem.

To do this, the present invention provides a modular device for liquid/liquid gravity separation of two liquid phases of different densities from a liquid fluid, more preferably the aqueous phase and the oil phase of a crude oil that has preferably been degassed in part or in full, said modular separation device resting on the sea bottom, preferably at great depth of at least 1000 m, the device being characterized in that it comprises:

a) at least one separation module, preferably a plurality of n separation modules, $m_i$ with i=1 to n, and n preferably being an integer in the range 5 to 10, each said separation module being supported by at least a first base resting on the sea bottom, said first base being anchored to the sea bottom by being fastened on an anchor, preferably fastened on a first pile of the "suction anchor" type embedded in the sea bottom, each separation module comprising:

a.1) a fluid delivery pipe extending in an axial longitudinal direction $X_1X_1$; and a.2) at least one gravity separation pipe extending in an axial longitudinal direction $X_2X_2$, preferably in rectilinear manner and parallel to said delivery pipe, and arranged in such a manner that:

a first end of said delivery pipe is connected to at least one first end of at least one separation pipe; and the second end of said delivery pipe is connected to a first outlet orifice of a first cylindrical manifold tank preferably extending in an axial longitudinal direction $Y_1Y_1$ perpendicular to the axial longitudinal direction $X_1X_1$ of said delivery pipe, said second end of each separation pipe being connected to a second inlet orifice of a second cylindrical manifold tank, which tank is preferably arranged in an axial longitudinal direction $Y_2Y_2$ parallel to said axial longitudinal direction $Y_1Y_1$ of said first tank; and a.3) a tubular bend device suitable for enabling said fluid to be transferred between said first end of said delivery pipe and each said first end of each said separation pipe of said separation module; and b) a common manifold device supported by a second base resting on the sea bottom, said second base being anchored to the sea bottom by being fastened on an anchor, preferably being fastened on a second pile of the "suction anchor" type embedded in the sea bottom, said common manifold device having a first support structure supported by said second base and supporting:

b.1) said first cylindrical tank comprising:

at least one first inlet orifice, preferably situated in a low portion of said first tank, said first inlet orifice being connected or for connection to an undersea feed pipe resting on the sea bottom feeding or for feeding said first tank with said fluid; and a plurality of said first outlet orifices, each said first outlet orifice including or co-operating with a first closure valve, at least one said first outlet orifice being connected to a respective said second end of a said delivery pipe, said first outlet orifices being arranged side by side in the longitudinal axial direction $Y_1Y_1$ of said first tank; and b.2) a said second tank comprising:

a plurality of second inlet orifices, each said second inlet orifice including or co-operating with a second closure valve, at least one said second inlet orifice being connected to a respective said second end of a separation pipe, said second inlet orifices being arranged side by side in the axial longitudinal direction $Y_2Y_2$ of said second tank;

at least one upper second outlet orifice co-operating with a first export pump connected or for connection to a first removal pipe; and at least one lower second outlet orifice comprising or cooperating with a second export pump connected or for connection to a second removal pipe.

Because a said tubular bend device is used, said delivery pipe and said separation pipe are both situated between the tubular bend device at one end and said first outlet orifice and said second inlet orifice at the other end. As a result, said first and second tanks are situated at the same end of said delivery pipe and said separation pipe, which same end is the end remote from the end at which said tubular bend device is located.

The present invention also provides a method of using a modular liquid/liquid gravity separation device of the invention, the method being characterized in that the oil phase and the aqueous phase of a crude oil, which has preferably been degassified in full or in part and which may contain sand, are separated by performing the following successive steps:

1) feeding crude oil to said first tank from at least one said undersea feed pipe resting on the sea bottom, which crude oil has preferably been degassed in full or in part in a liquid/gas separator device and comes from a well in the sea bottom, said pipe resting on the sea bottom being connected to a said first inlet orifice of said first tank;

2) causing said crude oil to flow from said first tank to said delivery pipe;

3) separating an upper oil phase and a lower aqueous phase, possibly containing sand, by causing said crude oil to flow within each said separation module;

4) removing the two-phase fluid leaving each said separation pipe via a said second inlet orifice of said second tank;

5) removing said oil phase from at least one said upper second outlet orifice via at least one said first removal pipe, preferably to a support floating on the surface, with the help of a said first pump; and 6) removing said aqueous phase from at least one said lower second outlet orifice via at least one second removal pipe with the help of a said second pump, preferably to a well in the sea bottom into which the water of said aqueous phase is reinjected.

It can be understood that the modular separation device of the invention is modular in that:

said separation modules can be installed separately and thus added while the separation device of the invention is in operation, and thus all or only some of said first outlet orifices of the first tank and said second inlet orifices of the second tank may be connected to a said separation module.

The device of the present invention is advantageous firstly because of its modular nature.

The modularity of the separation device of the invention makes it possible to add separation modules progressively as additional wells are brought into operation. For this purpose, said separation device may be fed from a plurality of feed pipes resting on the sea bottom and coming from a plurality of wells, the pipes being connected to a common said first inlet orifice of said first tank or to a plurality of first inlet orifices of the first tank.

Furthermore, it is known that the water cut and/or the composition of the oil phase of a crude oil can give rise to modifications to the curve plotting viscosity as a function of the pressure and the temperature of the crude oil, and these variations may require separation modules to be added or removed in order to optimize the operation of the separation device.

The modularity of the separation device of the present invention is also advantageous in that it makes it possible to add or remove separation modules while the device is in operation in order to modify the flow rate of the fluid as a function of the water cut of the fluid for treatment, and more generally as a function of the physicochemical characteristics of the fluid for treatment, which characteristics have an impact on flow rate and on head losses within the separation pipes, with this applying in particular to the viscosity of the fluid.

Implementing a said delivery pipe arranged relative to said separation pipe(s), as described above, enables said first ends to be fed with fluid via said delivery pipes and enables the fluid, once separated, to be removed, said separation pipes at their said second ends all situated at the same end of the device thus being suitable for coupling to a common manifold device that groups together said first and second tanks and a plurality of coupler elements at said first outlet orifices and at said second inlet orifices.

Furthermore, using such a common manifold device also makes it possible to group together the plurality of coupler elements at said first inlet orifices and said upper and lower second outlet orifices that are to be connected respectively to said pipes resting on the sea bottom and to said first and second removal pipes.

It is important to mention at this point that the fact that all of the coupler elements may be secured to one another and in a stationary position, grouped on a common manifold device, greatly facilitates the accuracy with which the following positioning and coupling operations can be performed:

positioning and coupling the manifold device on said second base at the sea bottom;

coupling said pipes resting on the sea bottom and said first and second removal pipes respectively with said first inlet orifices and with said upper and lower second outlet orifices; and positioning said separation modules relative to said first outlet orifices and said second inlet orifices of said common manifold device, and coupling them therewith.

If a said first tank were used at a first end of a separation pipe and a said second tank were used at the other end of the separation pipe, without using the delivery pipe, then the great distance between the coupler elements at the two ends of the separation pipe would require positioning and coupling to be performed at two spaced-apart points at those two ends, which would be more difficult.

Finally, using a plurality of separation modules makes it possible to use standard undersea pipes for the delivery pipe and for the separation pipe, and in particular pipes of standard diameter and thickness that are capable of withstanding implosion due to the pressure at the sea bottom, while avoiding the use of separation pipes of excessive length and the above-mentioned problems that stem therefrom, with this being achieved, amongst other reasons, by using the delivery pipe.

The device of the present invention makes it possible to provide a liquid/liquid separation device at the sea bottom with feed and separation pipes that are made using undersea oilfield pipes of standard diameter and thickness, in particular having diameters lying in the range 6 inches to 30 inches (150 mm to 750 mm).

It can be understood that each first or second pump is suitable for pumping a liquid from said second tank and for making it flow under pressure within a said first or second removal pipe.

Preferably, said pipes and said tanks are arranged in such a manner that:

each said gravity separation pipe extends in rectilinear manner in a longitudinal direction $X_2X_2$ situated in a plane common with the longitudinal direction $X_1X_1$ of said delivery pipe, preferably parallel to said delivery pipe;

said second cylindrical manifold tank is arranged in an axial longitudinal direction $Y_2Y_2$ parallel to said axial longitudinal direction $Y_1Y_1$ of said first tank;

the longitudinal directions $X_1X_1$ of all of said delivery pipes are arranged mutually in parallel; and the longitudinal directions $X_2X_2$ of all of said separation pipes are arranged mutually in parallel.

In a preferred embodiment, said common manifold device comprises:

i) a said first tank in which:

said first inlet orifice includes a first inlet pipe portion having an end held in a stationary position relative to said first support structure that includes a first coupler element coupled or for coupling to a first complementary coupler element at the end of said feed undersea pipe, said first inlet pipe portion preferably being a rigid first pipe portion with its said first coupler element being held in a stationary position at the underface of said first support structure; and each said first outlet orifice includes a rigid first outlet pipe portion with an end held in a position that is stationary relative to said first support structure having a second coupler element coupled or for coupling to a second complementary coupler element at a said second end of a delivery pipe; and ii) a said second tank in which:

each said second inlet orifice has a second rigid pipe portion with an end held in a position that is stationary relative to said first support structure and includes a third coupler element coupled or for coupling to a third complementary coupler element at a said second end of a separation pipe;

each said upper second outlet orifice is connected to a said first pump supported by said first support structure, said first pump being connected by a fourth coupler element to a said first removal pipe, preferably via a first removal pipe portion having an end including a said fourth coupler element, said fourth coupler element being held in a position that is stationary relative to said first support structure, more preferably at the underface of said first support structure, said fourth coupler element being coupled or for coupling to a fourth complementary coupler element at the end of said first removal pipe;

each said lower second outlet orifice is connected to a second pump supported by said first support structure, said second pump being connected by a fifth coupler element to a said second removal pipe, preferably via a second removal pipe portion having an end including a said fifth coupler element, said fifth coupler element being held in a position that is stationary relative to said first support structure, more preferably at the underface of said first support structure, said fifth coupler element being connected or for connection to a fifth complementary element at the end of a said second removal pipe; and said first, fourth, and fifth complementary coupler elements situated at the ends of said feed undersea pipe resting on the sea bottom and respectively of said first and second removal pipes are supported by said second base and are held in a stationary position at the surface of a first platform of said second base.

It can be understood that the ends of said first and second rigid pipe portions remain in a position that is stationary relative to said first support structure on their own as a result of the rigidity of said first and second pipe portions, i.e. without any specific fastener or support means engaging said first support structure.

In a manner known to the person skilled in the art, said coupler elements and complementary coupler elements are constituted by male and female portions respectively of automatic connectors of the jaw type, as sold by the suppliers Cameron (France) and Vetco (USA).

In a first variant embodiment, said delivery pipe presents a diameter smaller than the diameter of the separation pipe and is arranged above the separation pipe.

In a preferred embodiment, said separation module comprises an upper feed pipe arranged above at least two lower separation pipes.

It can be understood that under such circumstances, said bent connection device, which may in particular be Y-shaped or T-shaped, presents a top channel that is split into two bottom channels feeding said first ends of the two separation pipes.

The resulting double separation modules are advantageous since it is possible to use two separation pipes at the expense of only three automatic coupling connectors, as compared with four connectors that would be required if each of the separation pipes were fed by a different delivery pipe, it being understood that the unit cost of automatic connectors is extremely high and constitutes the main cost of a separation module.

More particularly, the inside diameter of the delivery pipe lies in the range 30% to 100% and preferably in the range 50% to 100% of the inside diameter of the separation pipe.

In another variant embodiment, a said separation module comprises a said feed pipe and a said separation module arranged side by side at a common depth and having the same diameter.

This embodiment is particularly advantageous since it makes it possible to begin separation as soon as the fluid starts to flow in the delivery pipe, naturally providing it is of sufficient diameter like the separation pipe. By proceeding in this way, it is possible to halve the length of the separation module; in particular, in this way, it is possible for the length L of the separation modules to remain less than 50 m, and preferably less than 30 m.

According to another particular characteristic, all of said separation modules are supported by a single said base in common, said first base extending in a longitudinal direction $Y_3Y_3$ perpendicular to the longitudinal directions XX', $X_1X_1$, $X_2X_2$ of said separation modules, and said first base being situated in the longitudinal direction XX' of said separation modules at a distance L1 from said first ends of said separation modules equal to a value lying in the range ⅓ to ½ of the total length L of said separation modules from said first ends of said separation modules.

Also advantageously, said separation module includes mechanical reinforcing elements providing a rigid connection between said delivery pipe and said separation pipe(s), preferably over their entire length.

It can be understood that these mechanical reinforcing elements keep the separation pipes linear and in particular prevent them sagging in their portions that extend between said first and second bases when only one said first base is used for supporting said separation modules.

Also advantageously, a modular liquid/liquid separation device of the invention includes a branch pipe from said upper second outlet orifice or from said first removal pipe, and/or a branch pipe from said lower second outlet orifice or said second removal pipe, preferably with the help of a three-port valve, so as to transfer into a said undersea feed pipe resting on the sea bottom and feeding said first tank a fraction of the liquid leaving said upper second outlet orifice or respectively said lower second outlet orifice, and more preferably while transferring said liquid fraction via a mixer situated at the level of said undersea feed pipe resting on the sea bottom.

Advantageously, said first base co-operates with first actuators suitable for adjusting the horizontal position or the angle of inclination of said separation modules relative to the horizontal, and/or said second base co-operates with second actuators suitable for adjusting the horizontal position or the angle of inclination of said separation modules and/or the horizontal position or the angle of inclination of said first and second tanks relative to the horizontal.

In a particular implementation of the method of use of the modular separation device of the invention, use is made of a modular liquid/liquid separation device in which at least one said first outlet orifice and at least one said second inlet orifice that are suitable for being connected to a common separation module are closed and not connected to a said separation module, and after implementing steps 1) to 6) of said above-defined method of use, the following successive steps are performed:

7.1) adding a said separation module that is lowered from the surface and that has said second ends of said delivery pipe and respectively of said separation pipe coupled to said unoccupied first outlet orifice and respectively to said unoccupied second inlet orifice; and then 8.1) opening said closure valves of said first outlet orifice and of said second inlet orifice.

In another implementation of the method of using the device of the invention, use is made of a modular liquid/liquid separation device having more than two separation modules, and after performing above-defined steps 1) to 6), the following successive steps are performed:

7.2) closing said closure valves of a first said outlet orifice and of at least one second said inlet orifice coupled to a common separation module, and 8.2) separating said separation module coupled to said first outlet orifice and said second inlet orifice having their valves closed, and then raising said separated separation module to the surface.

In another implementation of the method of using the device of the invention, in steps 5) and/or 6), a fraction of the liquid removed from said upper second outlet orifice and/or respectively from said lower second outlet orifice is taken and reinjected into said feed undersea pipe for mixing said liquid fraction with the feed crude oil, thereby modifying the water cut of the crude oil entering in said modular separation device.

This implementation is particularly advantageous for avoiding the crude oil being situated in a water fraction close to its point of inversion, as explained in the detailed description below.

Crude oils generally present viscosity that depends on their own physicochemical characteristics and they are subjected to head loss that depends on their viscosity, and also on the characteristics specific to each separation pipe. Thus, in general, the emulsion leaving the well has a viscosity that varies depending on its water cut and that presents a singular point for water at a particular percentage, which percentage varies from one crude to another. This point is known to the person skilled in the art and is referred to as the point of inversion. When the water cut comes close to the point of inversion, the viscosity of the crude increases and reaches a maximum at the point of inversion, after which it decreases once the point of inversion has been passed. It is desirable to avoid being in the vicinity of the point of inversion, since if the water cut is unstable then head losses become unbalanced among the various separation modules and that runs the risk of severely disturbing or even blocking the separation process.

This characteristic of the method is particularly advantageous for enabling the operating point of the separator to be kept far enough away from the dangerous point of inversion, as described in the detailed description below. The point of inversion corresponds to a viscosity maximum for the crude oil in question, with this maximum being obtained at a particular water cut. There is thus a risk of being at the point of inversion if the water cut is unstable in the crude oil being treated.

In another implementation of the method of using a device of the invention, after performing separation in application of above-defined steps 1) to 6), at least one separation module is cleaned in order to remove any sand that might be deposited on the bottom of its said separation pipe, the cleaning being performed by implementing the following successive steps:

7.3) opening said closure valves of said first outlet orifices and/or said second inlet orifices of the separation module(s) for cleaning and closing the closure valves of said first outlet orifices and/or of said second inlet orifices to which the other separation modules are connected, which other modules are greater in number than the separation modules for cleaning, with preferably only one separation module being for cleaning and maintained in open communication with said first outlet orifices and said second inlet orifices;

8.3) causing said crude oil to flow at an accelerated rate exclusively within said separation module(s) for cleaning; and 9.3) sending to the surface via said upper second outlet orifice all of the fluid leaving said second tank, said second pump co-operating with said lower second outlet orifice not being activated.

It can be understood that the acceleration of the flow rate of the fluid in step 8.3 results from some of the separation modules being closed.

The present invention also provides a method of installing a modular liquid/liquid gravity separation device of the invention on the sea bottom, the method being characterized in that the following steps are performed:

1) lowering a said common manifold device from the surface and placing it on a said second base anchored to the sea bottom, and coupling said first inlet orifice and said upper and lower second outlet orifices to said first and second removal pipes; and 2) lowering a said separation module from the surface and placing it on a first base anchored to the sea bottom, and coupling said second ends of said feed pipe and of said separation pipe with said first outlet orifices and respectively with said second inlet orifices of said common manifold device.

In practice, a modular gravity separation device of the invention advantageously presents the following dimensional characteristics:
  first tank:
    volume=0.15 $m^3$ to 8 $m^3$
    length=2 m to 10 m
    diameter=200 mm to 1000 mm
  second tank:
    volume=0.15 $m^3$ to 8 $m^3$
    length=2 m to 10 m
    diameter=200 mm to 1000 mm
  feed pipe:
    diameter=100 mm to 300 mm
    thickness of steel=6 mm to 30 mm
    length L=15 m to 75 m separation pipe (for a single pipe):
  diameter=150 mm to 500 mm
  steel thickness=6 mm to 40 mm
  length L=15 m to 75 m
number of separation modules=3 to 15
treatment rate=7.5 cubic meters per hour ($m^3/h$) to 1000 $m^3/h$ of crude oil, and
depth of installation=500 m to 3000 m.

BRIEF DESCRIPTION OF THE DRAWINGS

Other characteristics and advantages of the present invention appear in the light of the following detailed description of embodiments given with reference to FIGS. 1 to 8, in which:

FIG. 1 is a side view of a modular horizontal undersea separator of the invention resting on two suction anchors installed on the sea bottom;

FIGS. 1A and 1B are side views showing stages in the installation of the separator, leading to the final configuration of FIG. 1;

FIG. 2 is a plan view of the FIG. 1 device;

FIG. 3 is a view on axis XX of a two-tube separator module resting on an adjustable transverse support beam 9-1b that is canted relative to a suction anchor;

FIG. 4 is a plan view showing a mode of sweeping clean a separator pipe of a module with reference to FIG. 3, in which mode all of the oil stream is directed to a single said separator pipe in order to put the solid particles of sand into suspension and send them directly to the surface for treatment on broad the FPSO;

FIG. 5 is a view on the axis XX of a double-transit single-tube separation module resting on a said transverse line 9-1b;

FIGS. 6A and 6B describe a separation pipe in side view and in cross-section view fitted with internal devices 16 for creating turbulence;

FIG. 7C is a plan view of an additional device of the invention that makes it possible to avoid operating modes that are close to the point of inversion, by recycling a portion of the treated water, thereby having the effect of modifying the value of said water cut of the crude oil entering into the separator;

DETAILED DESCRIPTION OF THE PRESENTLY PREFERRED EMBODIMENTS

Figure 7A:
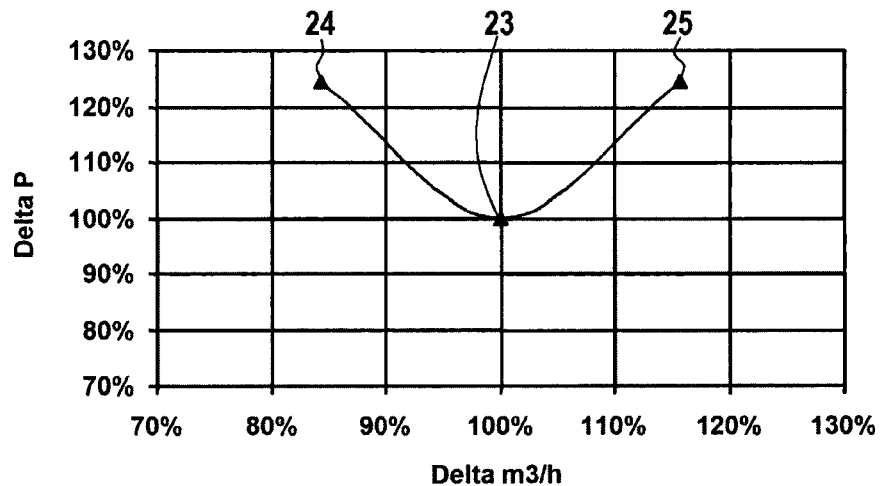
FIG. 7A is a diagram resulting from calculation showing head losses within a pipe corresponding to a water cut remote from the point of inversion.

FIGS. 1 and 2 show a modular gravity separation device 1 for liquid/liquid separation of the differing-density aqueous phase 11-1 and oil phase 10-1 of a crude oil that has preferably already been degassed in full or in part. Said modular separation device 1 rests on the sea bottom 30 and may rest at a great depth, of at least 1000 m.

The modular liquid/liquid gravity separation device 1 of the invention comprises a plurality of separation modules 1a connected to a common manifold device 1b. Each separation module 1a comprises a fluid delivery pipe 6 and at least one gravity separation pipe 7 of substantially the same length that is arranged beneath, rectilinearly and parallel to the delivery pipe 6. A tubular bend device 8 connects a first end 6-1 of the delivery pipe 6 to a first end 7-1 of each of the separation pipes.

The common manifold device 1b has a first tank 3 fed with crude oil by a feed pipe resting on the sea bottom 5 and via a first inlet orifice 3-1. The first tank 3 has a plurality of first outlet orifices 3a connected to a plurality of delivery pipes 6 forming parts of a plurality of separation modules 1a, the outlets being connected to the second ends 6-2 of said delivery pipes 6 and the tank feeding them with crude oil.

Two phases, an aqueous phase 11-1 and an oil phase 10-1 are separated within the separation pipes 7 before being poured into a second tank 4 via second inlet orifices 4a of said second tank to which the second ends 7-2 of the separation pipes 7 are connected. The oil phase 10-1 is conveyed to the surface from an upper outlet orifice 4b-1 of the second tank 4 with the help of a pump 10a and via a first removal pipe 10. The aqueous phase 11-1 is conveyed to the sea bottom 30 with the help of a second pump 11a and through a second removal pipe 11, preferably for reinjection into another well nearby, from a lower outlet orifice 4b-2 of the second tank 4.

In FIG. 2, the device may be connected to:

1) seven separation modules 1a, $m_i$ with i=1 to 7, all of the separation modules 1a, $m_i$ being capable of being supported by a common single first transverse support beam 9-1b of a first base 9-1 fastened to the top of a first suction-anchor type pile 20-1 embedded in the sea bottom 30. Said first phase 9-1 has a bottom platform 9-1a arranged at the top of the first pile 20-1 and supporting first actuators 13, which first actuators 13 support a first transverse support beam 9-1b extending in a transverse direction $Y_3Y_3$.

The first cylindrical manifold tank 3 extends in an axial longitudinal direction $Y_1Y_1$ perpendicular to the axial longitudinal directions $X_1X_1$ of the delivery pipe 6 and $X_2X_2$ of the separation pipe 7. The second cylindrical manifold tank 4 is arranged in an axial longitudinal direction $Y_2Y_2$ parallel to said axial longitudinal direction $Y_1Y_1$ of said first tank 3.

The common manifold device 1b has a first support structure 2, which structure supports said first and second tanks 3 and 4. Said first support structure 2 is itself supported by a second base 9-2 resting on the sea bottom 30. The second base 9-2 is fastened to the top of a second suction-anchor type pile 20-2 engaged in the sea bottom 30.

The first inlet orifice 3-1 is situated low down in said first tank, and it has a first inlet pipe portion with its end including a first coupler element 5a coupled to or for coupling to a complementary first coupler element 5b at the end of the undersea feed pipe 5. Said first coupler element 5a is held in a stationary position on the underface of a first platform 2b of said first support structure 2.

Each said first outlet orifice 3a has a first outlet pipe portion that is rigid and forms a bend, with its end including a second coupler element 3a-2 connected to or for connection to a complementary second coupler element 6-3 of a said second end 6-2 of the delivery pipe 6. The second coupler element 3a-2 is held in a stationary position relative to the first support structure 2 by the fact that said bend-forming first outlet pipe portion 3a is rigid and relatively short, and also by the fact that the first tank 3 is itself supported by and fastened to said top platform 2b of the first support structure 2.

Each of the seven second coupler elements 3a-2 includes or co-operates with a first closure valve 3a-1. Said first outlet orifices 3a are arranged side by side in the longitudinal axial direction $Y_1Y_1$ of the first tank 3. Only five of said first outlet orifices 3a, i.e. those of the separators $m_2$ to $m_6$, are connected respectively to one of said second ends 6-2 of a delivery pipe 6.

Each said second inlet orifice 4a has a second rigid pipe portion with its end including a third coupler element 4a-2 connected to or for connection to a complementary third coupler element 7-3 at a said second end 7-2 of the separation pipe 7. Said third coupler element 4a-2 is held in a stationary position relative to said first support structure 2, 2a by the fact that the first inlet pipe portion 4a is rigid and relatively short and also by the fact that the second tank is itself supported and held in a stationary position relative to said top platform 2b of the first support structure 2. Each of the seven third coupler elements 4a-2 includes or co-operates with a second closure valve 4a-1. Said second inlet orifices 4a are arranged side by side in the axial longitudinal direction $Y_2Y_2$ of said second tank 4. Only five of said second inlet orifices 4a, i.e. those of the separation modules $m_2$ to $m_6$, are connected to a said second end 7-2 of a separation pipe 7.

The first outlet orifices 3a of said first tank 3 are arranged on the other side of the vertical longitudinal axial plane of the first tank 3 relative to said first inlet orifice 3-1. Said upper and lower second outlet orifices 4b-1 and 4b-2 of the second tank 4 are arranged on the other side of the vertical longitudinal axial plane of the second tank 4 relative to said second inlet orifices 4a.

Said upper second outlet orifice 4b-1 is connected to a said export pump 10a supported by the transverse top platform 2b of said first structure 2, 2a. Said first pump 10a is itself connected to a first removal pipe 10 via a first removal pipe portion 10b that includes a fourth coupler element 10c at its end. Said fourth element 10c is held in a stationary position at the underface of said top platform 2b of said first support structure 2. Said fourth coupler element 10c is connected to or for connection to a complementary fourth coupler element 10d at the end of said first removal pipe (10).

Said lower second outlet orifice 4b-2 is connected to a said second export pump 11a supported by the top platform 2b of said first support structure 2. Said second pump 11a is itself connected to a second removal pipe 11 via a second removal pipe portion 11b that itself includes a fifth coupler element 11d at its end. Said fifth coupler element 11d is connected to or for connection to a complementary fifth coupler element 11d at the end of a said second removal pipe 11.

Said complementary first, fourth, and fifth coupler elements 5b, 10d, and 11d situated at the ends of said feed undersea pipe resting on the sea bottom (5) and respectively of said first and second removal pipes (10, 11) are supported by a first platform $9_2$b of said second base 9-2 and held in a stationary position on the surface of said first platform $9_2$b of said second base 9-2.

The various first, second, third, fourth, and fifth coupler elements are constituted by male or female portions of automatic connectors known to the person skilled in the art, while the complementary first, second, third, fourth, and fifth coupler elements are constituted respectively by female or male portions of said automatic connectors.

Said first outlet orifices of said first tank are arranged on the other side of the vertical longitudinal axial plane of said first tank in the direction XX relative to said first inlet orifice, and said upper and lower second outlet orifices of said second tank are arranged on the other side of the vertical longitudinal axial plane of the second tank in the direction XX relative to said second inlet orifices.

The first tank 3 is constituted by a cylindrical tank of circular section. It is fed via an undersea feed pipe 5 leading into the first inlet pipe 3-1 with crude oil that has been partially degassed in an undersea installation (not shown) and that comes from a remote well.

The second tank 4, also referred to as a "manifold" tank, is shown as being substantially in the form of a rectangular parallelepiped in the figures in order to distinguish it more clearly from the first tank 3. Nevertheless, the second tank 4 is preferably circular in cross-section with rounded ends in order to withstand bottom pressure better.

The second tank 4 receives the water and oil fractions 11-1 and 10-1 of the crude oil after separation, the oil fraction 10-1 being removed via the upper outlet orifice 4b-1, while the aqueous fraction 11-1 is removed via the lower outlet orifice 4b-2.

The first pump 10b sends the oil 10-1 under pressure through the first removal pipe 10 leading to an FPSO floating support situated at the surface several kilometers away.

The second pump 11b sends the aqueous phase 11-1 under pressure to a reinjection well (not shown) via the second removal pipe 11 leading to the water injection well that is situated nearby.

Separation proper is performed in each of the separation modules $m_2$ to $m_6$, 1a in a hairpin configuration. Each separation module $m_2$ to $m_6$ is constituted by a top delivery pipe 6 for delivering crude oil situated above the separation pipe proper 7. The first end or left end 6-1 of the delivery pipe 6 is connected in leaktight manner to the left end or first end 7-1 of the separation pipe 7 by a U-shaped bent transition pipe portion 8 that presents diameter that varies, preferably continuously, in order to pass from the diameter D6 to the larger diameter D7 of the pipe 7. At the first end 6-1 of the pipe 6, the crude oil is a water-and-oil mixture that constitutes an emulsion. Thereafter, as the fluid advances regularly along the separation pipe 7, the effect of gravity acting on the two fluids of different densities causes particles of oil to migrate naturally upwards and particles of water to migrate naturally downwards within the separation pipe 7. Separation is generally fully completed at a length L2 that represents at least ½ or ⅔ of the length L of the separation pipe 7 starting from said first ends 7-1.

Mechanical reinforcement elements 12 connecting together the delivery pipe 6 and the separation pipe 7 impart a large second moment of area to the hairpin assembly as constituted in this way together with great stiffness in the vertical plane, thereby guaranteeing excellent linearity for the separation pipe 7. Because the separation pipe 7 rests on cradles $9_1$c arranged above the top beam $9_1$b having its transverse longitudinal axis $Y_3Y_3$ situated at about a distance $L_1$ equal to ⅓ of the distance L from the first end 7-1, any sagging of the portion of the separation pipes 7 between the first base 9-1 and the second base 9-2 is extremely small. The first actuators 13 supported by a bottom platform $9_1$a at the top of the first pile 20-1 and supporting said transverse top beam $9_1$b enable the height and the horizontal position or the slope of said top beam $9_1$b to be adjusted and thus enable the height and the horizontal position or the slope of all of the separation modules 1a to be adjusted.

In FIGS. 2 and 7C, it can be seen that there are two additional locations for the separation modules $m_1$ and $m_7$ that are not occupied. It can be understood that the closure valves 3a-1 and 4a-1 at the ends of the two first inlet orifices 3a and respectively two of the second inlet orifices 4a of the unoccupied locations of the modules $m_1$ and $m_7$ are in a closed position, while the closure valves for the modules $m_2$ and $m_6$ are in the open position.

The closure valves 3*a*-1 and 4*a*-1 may be of conventional type and operated mechanically by the robotic arm of an automatic submarine remotely operated vehicle (ROV) 40 that is controlled from the surface. However, they are advantageously of the automatic type, being operated from the surface via a direct connection between the FPSO and the undersea separator device 1. Such a direct connection may be provided by an umbilical (not shown) serving to deliver control signals and electrical power to the various automatic devices of the undersea separator 1.

A module 1*a* is isolated by closing the valves 3*a*-1 of said first outlet pipes 3*a* and the valves 4*a*-1 of said second inlet pipes 4*a* of the corresponding modules $m_2$, $m_6$, thereby enabling said separation module 1*a* to be removed for raising to the surface, either for inspection or for maintenance, or else for replacement with a module presenting different diameter and length characteristics. When changing module type, it is naturally appropriate to change all of the modules so that they are all identical, and thus present identical separation performance. It should be observed that the new modules 1*a* should be fitted at their said second ends or right ends 6-2, 7-2 with respective female-male portions that are identical to those of the modules 1*a* that they replace, these portions corresponding respectively to the male-female ends of the automatic connectors 3*a*-2 situated at the ends of the first outlet pipes 3*a* and 4*a*-2 at the ends of the second inlet pipes 4*a*.

Thus, as a function of variations in the characteristics of the crude oil coming from the well, and in order to guarantee that separation takes place correctly, one or more separation modules 1*a* should be isolated, or advantageously removed, so as to maintain an optimum speed for the fluid that is to be separated. In the event of an increase in the flow rate from the well over time, e.g. because of more water arriving (an increase in the water cut), it is advantageous to install one or more additional separation modules, e.g. two additional separation modules on the lines $m_1$ and $m_7$ that are in reserve in the separator device 1 of FIG. 2. Under other circumstances, and throughout the lifetime of the well, which may be as long as 20 years or 25 years, or even longer, it can be necessary to substitute all of the separation modules 1*a* with modules that are better suited in terms of the diameter and the length L of said separation pipes 7.

In order to ensure proper operation, all of the separation modules 1*a* must have identical slopes. In general, they need to be in a horizontal position. However, depending on the physiochemical characteristics of the crude oil, it may be necessary for the separation modules to slope a little in the XoZ plane by a few degrees either in positive manner or else in negative manner, e.g. at an angle that may be as much as ±6° relative to the horizontal. For this purpose, the ROV 40 may be used to actuate said first actuators 13 at said first base 9-1. The second base 9-2 is also fitted with a plurality of second actuators 14 similar to the first actuators 13, these second actuators 14 being supported by a top platform $9_2$b at the top of the second base 9-2, said second actuators 14 supporting the bottom platform 2*a* of said first support structure 2 and thus making it possible to adjust the height, and the horizontal position or the slope of said device 1*b* and/or of said separation modules while adjusting the first actuators 13. It is desirable to guarantee that the separation pipes 7 of said first and second tanks 3 and 4 are accurately horizontal or slope a little in well adjusted manner in the planes XoZ or YoZ. Once level adjustments have been completed at said first and second actuators 13 and 14, it is possible to install mechanical wedges 15, e.g. constituted by a set of complementary sloping wedges 15-1, 15-2 that are put into place and adjusted by the ROV 40, after which the hydraulic actuators can be retracted ready for future reactivation in order to readjust the horizontal position of the assembly or to modify its angle of inclination.

Since all of the separation modules 1*a* are identical, the overall flow rate entering the first inlet pipe 3-1 is divided by the number of separation modules. In other words, the flow rate in each of the five separation modules 1*a* is equal to ⅕ of the flow rate entering the first inlet pipe 3-1. At said first outlet orifices 3*a*, all of the separation modules are at the same pressure level corresponding to the pressure of the first tank 3, and at the first inlet orifice 4*a*, they are all at the same pressure corresponding to the pressure of the manifold second tank 4. In the event of unbalance in any one of the separation modules, e.g. a flow rate reduction specific to said separation module, the fluid flow rate within the other separation modules will be significantly increased, thereby increasing head loss within those separation pipes and thus reducing the flow rate specific to said other separation modules, thereby rebalancing the flow rate of the various separation modules. In contrast, in the event of sand being deposited in said delivery pipes 6 and above all in said separation pipe 7 of a separation module, the module will no longer have the same hydrodynamic characteristics and the set of separation modules will become unbalanced, since it is possible that some of them will become ineffective or even blocked. To avoid this unwanted blocking phenomenon, closure is regularly effected of the corresponding valves 3*a*-1 and 4*a*-1 of all of the separation modules, other than the valves of one of the separation modules that is to be swept clean. During the separation process, the fluid speed in the separation module does not prevent large particles of sand becoming deposited in the pipes 6 and 7 since it is only particles of smaller diameter that are entrained by the oil and by the water.

By directing all of the fluid production to a single separation module, the fluid speed in said separation module is multiplied substantially by five, so the sand deposited in the pipes 6 and 7 of said module is then entrained to the manifold tank 4. During the cleaning operation, the fluid continues to flow, but the separator device 1 is not in operation. Before beginning cleaning, the reinjection of water into the remote well or rejection of the treated water into the sea is stopped and all of the fluid is sent to the surface, i.e. the oil that was being subjected to separation at the time of the stoppage, and then after a short time, the crude oil loaded with the sand that results from cleaning the separation module. After a few minutes, once the separation module has been cleaned, the corresponding valves are closed to isolate it and simultaneously the valves 3*a*-1, 4*a*-1 of the following separation module are opened. This process is repeated from module to module, and once all of the separation modules have been cleaned, all of the valves 3*a*-1 and 4*a*-1 are opened in order to restart the separation process.

During this cleaning period, and also during the stage of restarting the separation process, all of the production is sent to the surface for treatment on board the FPSO.

This restarting stage may last for 15 min to 30 min or even less, and the entire cleaning and restarting process may be performed in 30 min to 45 min depending on the quality of the crude oil in question and on the number of separation modules. This cleaning is advantageously performed on a regular basis, e.g. every month, or even more often, so as to avoid excessive accumulation of sand that might otherwise disturb the operation of the separator 1. The crude oil sent to the surface is then treated and the quantity of sand it contains is advantageously measured accurately in order to optimize the way in which the date of the next cleaning operation is determined.

When a separation module has two separation pipes 7, as shown in FIG. 3, the cleaning procedure is slightly different. It is described in detail below with reference to FIG. 4 which is a plan view of said double separation module referred to as a "two-tube" module, i.e. a module having two separation pipes 7.

All of the valves 3a-1, and where appropriate the valves 4a-1 of the other separation modules are closed, and the valve 4a-1 of one of the separation modules 7a or 7b of a two-tube separation module for cleaning is closed. All of the crude oil then passes along the delivery pipe 6 and into the second separation pipe 7b or 7a as the case might be, the speed of the fluid entrains the deposit of sand, and then after a few minutes the initially-closed valve 4a-1 of the separation pipe 7a or 7b is opened and the other valve 4a-1 of the other separation pipe 7b or 7a respectively is closed, thereby having the effect of directing all of the fluid at high speed along the other separation pipe of the same two-tube module. After a few minutes, the valve 3a-1 of the separation module as cleaned in this way is closed, and then the procedure is repeated from module to module with each of the separation modules.

In a preferred version of the invention described with reference to FIG. 5, the delivery pipe 6 has the same diameter as the separation pipe 7 and they are arranged parallel in a common horizontal plane XoY. As a result, as soon as crude oil leaves the first outlet pipe 3a connected to the first tank 3, separation can begin and it then takes place over twice the distance, i.e. a first distance L corresponding to the length of the delivery pipe 6 in the go direction and then once more over the distance L a second time in the return direction corresponding to the length of the separation pipe 7. By proceeding in this way, the length L of the module is advantageously shortened, which is advantageous when the separation modules that are required given the quality of the crude oil or the quantity of the crude oil for processing makes it necessary to have a very long length, e.g. a length of 60 m to 70 m. It is thus possible to halve the length of the separation modules.

In this configuration, it is essential for both of the pipes 6 and 7 to be in the same horizontal plane, since if they were superposed, then on passing the fluid from the top pipe 6 to the bottom pipe 7, a portion of the water that has already been separated in the low portion of the top pipe 6 would naturally drop under the effect of gravity into the bottom pipe 7 where it would be re-mixed. Conversely, the lighter oil portion would accumulate in the top pipe 6 but would nevertheless end up by reaching the bottom pipe 7 after a certain length of time; this would likewise lead to re-mixing of the oil and the water in more or less random manner, thereby going against the looked-for object.

In the embodiment of the two-tube module type shown in FIG. 3, a reinforcing structure 12 is advantageously made available for holding the triangular type positioning of the top pipe 6 relative to the two bottom pipes 7. Similarly, in a double-transit single-tube separation module as shown in FIG. 5, a triangular reinforcing structure 12 is likewise arranged between a top H-beam 12a then advantageously acting as a top member of the module relative to the two bottom pipes 7 for a double-transit single-tube separation module as shown in FIG. 5, thereby imparting great rigidity to the assembly.

In the versions described with reference to FIGS. 1 to 3, the delivery pipes 6 are smaller in diameter than the separation pipes 7, 7a-7b, such that the crude oil flows faster and separation does have the time to become significant in the delivery pipe 6, in order to avoid re-mixing on passing into the separation pipe 7, in particular in the tubular bend devices 8. As mentioned above, such re-mixing could destabilize the water-oil separation process. Thus, the inside diameter of the delivery pipe 6 lies in the range 30% to 100% and preferably in the range 50% to 100% of the inside diameter of the separation pipe 7, 7a-7b.

During operations of cleaning the separation modules 1a, the speed of the fluid in the delivery pipe 6 is faster than the speed in the separation pipe 7, 7a-7b. However, under all circumstances, the speed in the separation pipe 7, 7a-7b is faster than the speed needed for putting particles of sand back into suspension.

In order to improve the effectiveness with which the separation modules are cleaned, it is advantageous for baffles 16 to be arranged in the separation pipes 7, as shown in FIG. 6A which is a longitudinal section view of the separation pipe 7, and in FIG. 6B which is a cross-section on YoZ. These baffles are for creating turbulent vortices mainly in the low portion of the separation pipe and they are advantageously arranged in the bottom third of the height of said pipe. These baffles are thus mainly in the water portion of the pipe and they are dimensioned so as to minimize the creation of head losses in normal operation, and thus minimize turbulence in normal operation, and also to create intense turbulent movement once the speed of the fluid has been increased, as explained above. These baffles are preferably secured to the pipe by welding from the inside of the pipe during manufacture of the modules.

The pumps 10a, 11a incorporated in the carrier structure 2 are advantageously arranged in modules that can be extracted merely by being hoisted from the surface. For this purpose, the pumps are fitted with automatic inlet and outlet connectors and with undersea electrical connections known to the person skilled in the art so that they can be disconnected and return to the surface in order to perform necessary maintenance prior to reinstalling them or more simply replacing them. The pumps may also be controlled and powered from the surface via umbilicals that are not shown.

The pipes 6 and 7 of the separation modules 1a are advantageously made of a material that is insensitive to corrosion, preferably stainless steel or duplex steel so that the inside surfaces of said pipes do not change over time and so that their hydrodynamic performance remains identical, in particular between the various separation modules and substantially constant throughout the duration of operation.

By way of example, an undersea separator 1 of the invention for use in an end-of-life oilfield, i.e. a series of wells that produce mostly water and some oil serves to send to the surface only the oily remainder of the crude. Thus, in order to treat 25,000 barrels of crude oil per day, i.e. about 4000 cubic meters ($m^3$) per day, or indeed 167 $m^3$/h, that presents a water cut of 75%, a separation device 1 having three separation modules 1a should be used, each comprising a top delivery pipe 6 having an outside diameter of 200 mm and a thickness of 8.55 mm, a bottom separation pipe 7 having an outside diameter of 300 mm and a thickness of 12.8 mm, a circular tubular first reservoir 3 with rounded ends having a length of 5 m, an outside diameter of 0.75 m and a thickness of 32.1 mm, and a tubular second tank 4 of circular section with rounded ends having a length of 5 m, an outside diameter of 1 m, and a thickness of 42.8 mm. The pipes 6 and 7 of length 50 m are advantageously fitted with a thermal insulation system presenting a thickness of 100 mm for each pipe and constituted by an insulating gel contained in a deformable envelope, such as described in earlier patent applications in the name of the Applicant, each of the separation modules weighing about 25 metric tonnes (t) in air and about 20 t in water.

The manifold device 1b comprising the first tank 3, the second tank 4, the support structure 2, and the automatic valves 3a-1, 4a-1, the pumps 10a, 11a and all of the automatic connectors weigh about 25 t in air and 20 t in water.

The steel suction anchor 20-2 of hollow cylindrical shape has a diameter of 6 m, a length of 35 m, and a thickness of 15 mm, thus representing a weight of about 75 t in water, including the second base 9-2 and the second actuators 14. The suction anchor 20-1 has the same hollow steel shape and is made of steel, measuring 2.5 m in diameter, 20 m in length, with a thickness of 10 mm, thus representing a weight of about 15 t in water, including the first base 9-1 and the first actuators 13. By making use of such an undersea separator 1, 75% of the production (i.e. 3000 m$^3$ of water per day) is left at the sea bottom with only the 25% representing all of the commercial value of the crude oil that is produced being raised to the FPSO, i.e. about 1000 m$^3$ of oil per day.

All of the separation modules 1a are at common reference pressures at the feed point 6-2 (inlet pressure) and at the collection point 7-2 (outlet pressure). This means that the loss of head through the separators is identical. Thus, for identical composition, and unless one of the pipes 7 presents a smaller diameter (e.g. as a result of deposited solids), the flow rate is equal in each of the separation modules. The only way of destabilizing the flow rate is to generate a composition difference between the separation modules. By imposing the same head loss, there results two possible flow rate-and-composition pairs: a first pair in which the flow rate and the compositions are identical (reference case 23); and another pair with one pipe 7 that is fed at a low rate 24-24a with liquid that is more viscous than the reference composition, and the other pipe that is fed at a high flow rate 25-25a with liquid that is less viscous than the reference composition.

The diagram of FIG. 7A shows the variation in head loss associated with crude oil presenting a water cut that is remote from the point of inversion. It can be seen that the system is easy to stabilize and difficult to destabilize. The reference point 23 corresponds to a minimum head loss, so any reduction 24 or increase 25 in the flow rate-and-viscosity pair leads to an increase in head loss, with the system thus tending to return naturally towards the reference point 23. Thus, when far from the point of inversion, variations in composition give rise to small variations in viscosity (positive 25 or negative 24), thereby increasing the overall head loss of the system and tending to return the flow rate towards its equilibrium state 23. The system is naturally stable.

Figure 7B:
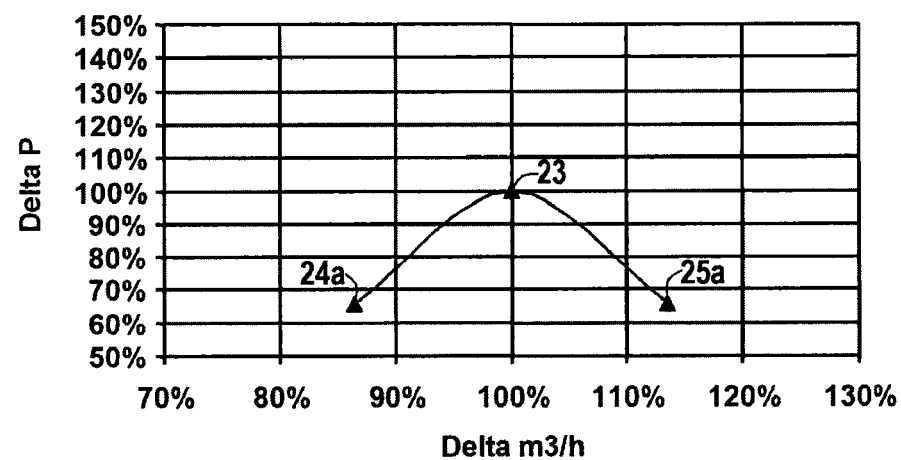
FIG. 7B is a diagram similar to the diagram of FIG. 7A resulting from calculation showing the head losses within a pipe corresponding to a water cut close to the point of inversion.
Figure 8A:
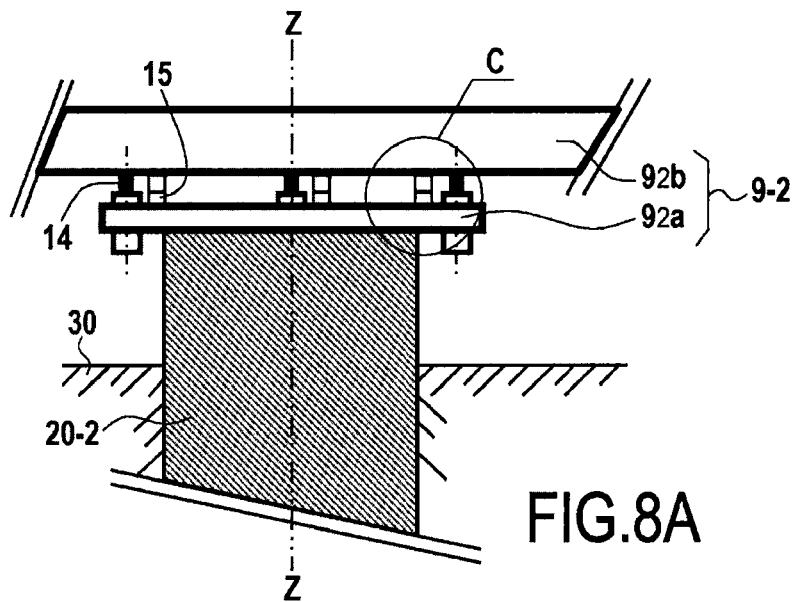
FIGS. 8A and 8B are a side view and a plan view of the second actuators 14 carried by said second base 9-2 and supporting said support structure 2 of the manifold device 1b.
Figure 8B:
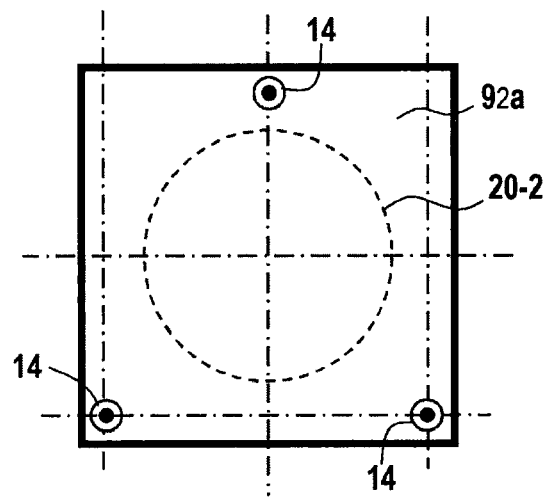
Figure 8C:
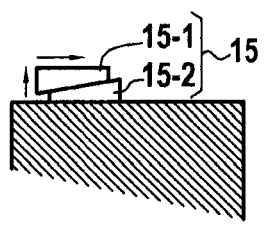
FIG. 8C is an illustration of permanent wedging means 15 for use once the support structure 2 has been adjusted to a horizontal position with the help of second actuators 14 on the base 9-2, as shown in plan view in FIG. 8B.

The diagram of FIG. 7B corresponds to a crude oil having a water cut corresponding to the point of inversion: here it can be seen that the system is not very stable. The reference point 23 then corresponds to a maximum head loss, so any reduction 24a or increase 25a in the flow rate-and-viscosity pair leads to a decrease in head loss, with the system thus tending to stabilize towards a new equilibrium state (24a, 25a) that presents asymmetry in flow rate and composition. Thus, at the point of inversion, small variations in composition give rise to drastic variations in viscosity by placing the points 24a and 25a on either side of the point of inversion, i.e. with viscosities that are much less than at the reference point 23. This significant drop in viscosity reduces overall head loss and tends to leave the system in its unbalanced state (24a, 25a). The system is then naturally unstable.

In order to avoid being in the vicinity of the point of inversion, it is advantageous to recycle the oil obtained at the outlet from the manifold tank 4, as shown in FIG. 7C. To this end, a three-port valve 18 is placed on the pipe portion 10b, which valve can be adjusted from the surface so as to take a fraction of the oil production, e.g. 30%, and reinject it via a branch pipe 17 into a mixer 19 situated on the crude oil feed pipe 5. The oil as reinjected and mixed with the crude in this way has the effect of modifying the water cut of the incoming crude and thus of moving away from the point of inversion that is to be avoided. Depending on circumstances, it may be necessary to recycle, not oil as described above, but rather water, in appropriate proportions, which may be similar or slightly different. The water will be taken from the pipe portion 11b in order to be reinjected in the same manner into the crude oil feed pipe.

In order to obtain the water cut of crude oil in real time, it is advantageous to measure the specific flow rate of treated oil 10-1 and of treated water 11-1, e.g. in each of the pumps 10a-11a, using means known to the person skilled in the art, with this information then being returned to the surface, for example, so that the operator can trigger recycling of an appropriate percentage of water or of oil so as to move away from the unwanted point of inversion.

In order to deposit the separation device 1 on the sea bottom, the following successive steps are performed:

1.1) lowering a said common manifold device 1b from the surface, the lowered device having said first, third, fourth, and fifth coupler elements 3a-2, 4a-2, 10c, 11c at the ends of said pipes of said first outlet orifice 3a, said second pipe portion of said second inlet orifice 4a, and said first pipe portion 11b supported by said first support structure element 2a; and 1.2) coupling said fourth and fifth coupler elements to fourth and fifth complementary coupler elements 6, 10d, 11d at the ends of said undersea feed pipes resting on the sea bottom and said first and second removal pipes held in position supported at said second base anchored to the sea bottom; and 2.1) lowering from the surface a said separation module 1a fitted with said second and third coupler elements complementary to said second ends of the delivery pipe and of the separation pipe 6-2 and 7-2 respectively that are arranged on said first base 9-1 anchored to the sea bottom; and 2.2) coupling said complementary second and third coupler elements 6-3, 7-3 of the separation module 1a with said second and third coupler elements at the ends of said first outlet orifices 3a and said second inlet orifices 4a.

The positioning of said common manifold device and of said separation module relative to said second base and said first base respectively, and the engagement of their respective couplings are performed by the robotic arm of an automatic undersea ROV controlled from the surface.

In the description of the invention, a feed pipe 6 is described that is situated above or at the same level as the separation pipe 7, however the feed pipe 6 could also be situated below the separation pipe 7: the separation process would then be identical.

The invention claimed is:

1. A modular device for liquid/liquid gravity separation of two liquid phases of different densities from a liquid fluid, more preferably the aqueous phase and the oil phase of a crude oil, said modular separation device resting on the sea bottom, wherein the device comprises:
 a) at least one separation module, each said separation module being supported by at least a first base resting on the sea bottom, said first base being anchored to the sea bottom by being fastened on an anchor, each separation module comprising:
  a.1) a fluid delivery pipe extending in an axial longitudinal direction $X_1 X_1$; and a.2) at least one gravity separation pipe extending in rectilinear manner in an axial longitudinal direction $X_2X_2$, and arranged in such a manner that:
a first end of said delivery pipe is connected to at least one first end of at least one separation pipe; and
the second end of said delivery pipe is connected to a first outlet orifice of a first cylindrical manifold tank, said second end of each separation pipe being connected to a second inlet orifice of a second cylindrical manifold tank; and
a.3) a tubular bend device suitable for enabling said fluid to be transferred between said first end of said delivery pipe and each said first end of each said separation pipe of said separation module; and
b) a common manifold device supported by a second base resting on the sea bottom, said second base being anchored to the sea bottom by being fastened on an anchor, said common manifold device having a first support structure supported by said second base and supporting:
b.1) said first cylindrical manifold tank comprising:
at least one first inlet orifice, said first inlet orifice being connected, or configured for connection, to an undersea feed pipe resting on the sea bottom feeding or for feeding said first cylindrical manifold tank with said fluid; and
a plurality of said first outlet orifices, each said first outlet orifice including or co-operating with a first closure valve, at least one said first outlet orifice being connected to a respective said second end of said delivery pipe, said first outlet orifices being arranged side by side in the longitudinal axial direction $Y_1Y_1$ of said first tank; and
b.2) said second cylindrical manifold tank comprising:
a plurality of second inlet orifices, each said second inlet orifice including or co-operating with a second closure valve, at least one said second inlet orifice being connected to a respective said second end of a separation pipe, said second inlet orifices being arranged side by side in the axial longitudinal direction $Y_2Y_2$ of said second tank;
at least one upper second outlet orifice co-operating with a first export pump connected, or configured for connection, to a first removal pipe; and
at least one lower second outlet orifice comprising or co-operating with a second export pump connected or for connection to a second removal pipe.

2. The modular liquid/liquid gravity separation device according to claim 1, wherein:
each said gravity separation pipe extends in rectilinear manner in a longitudinal direction $X_2X_2$ situated in a plane common with the longitudinal direction $X_1X_1$ of said delivery pipe, preferably parallel to said delivery pipe;
said second cylindrical manifold tank is arranged in an axial longitudinal direction $Y_2Y_2$ parallel to said axial longitudinal direction $Y_1Y_1$ of said first tank;
the longitudinal directions $X_1X_1$ of all of said delivery pipes are arranged mutually in parallel; and
the longitudinal directions $X_2X_2$ of all of said separation pipes are arranged mutually in parallel.

3. The modular liquid/liquid gravity separation device according to claim 1, wherein said common manifold device comprises:
i) a said first cylindrical manifold tank in which:
said first inlet orifice includes a first inlet pipe portion having an end held in a stationary position relative to said first support structure that includes a first coupler element coupled, or configured for coupling, to a first complementary coupler element at the end of said feed undersea pipe, said first inlet pipe portion with its said first coupler element being held in a stationary position at the underface of said first support structure; and
each said first outlet orifice includes a rigid first outlet pipe portion with an end held in a position that is stationary relative to said first support structure having a second coupler element coupled, or configured for coupling, to a second complementary coupler element at a said second end of a delivery pipe; and
ii) a said second cylindrical manifold tank in which:
each said second inlet orifice has a second rigid pipe portion with an end held in a position that is stationary relative to said first support structure and includes a third coupler element coupled or for coupling to a third complementary coupler element at a said second end of a separation pipe;
each said upper second outlet orifice is connected to a said first export pump supported by said first support structure, said first export pump being connected by a fourth coupler element to a said first removal pipe, via a first removal pipe portion having an end including a said fourth coupler element, said fourth coupler element being held in a position that is stationary relative to said first support structure, said fourth coupler element being coupled or for coupling to a fourth complementary coupler element at the end of said first removal pipe;
each said lower second outlet orifice is connected to a second export pump supported by said first support structure, said second export pump being connected by a fifth coupler element to a said second removal pipe, via a second removal pipe portion having an end including a said fifth coupler element, said fifth coupler element being held in a position that is stationary relative to said first support structure, said fifth coupler element being connected, or configured for connection, to a fifth complementary element at the end of a said second removal pipe; and
said first, fourth, and fifth complementary coupler elements situated at the ends of said feed undersea pipe resting on the sea bottom and respectively of said first and second removal pipes are supported by said second base and are held in a stationary position at the surface of a first platform of said second base.

4. The modular liquid/liquid gravity separation device according to claim 1, wherein said delivery pipe presents a diameter smaller than the diameter of the separation pipe and is arranged above the separation pipe.

5. The modular liquid/liquid gravity separation device according to claim 1, wherein said separation module comprises an upper feed pipe arranged above at least two lower separation pipes.

6. The modular liquid/liquid gravity separation device according to claim 1, wherein a said separation module comprises a said feed pipe and a said separation module arranged side by side at a common depth and having the same diameter.

7. The modular liquid/liquid gravity separation device according to claim 1, wherein all of said separation modules are supported by a single said base in common, said first base extending in a longitudinal direction $Y_3Y_3$ perpendicular to the longitudinal directions XX', $X_1X_1$, $X_2X_2$ of said separation modules, and said first base being situated in the longitudinal direction XX' of said separation modules at a distance L1 from said first ends of said separation modules equal to a value lying in the range ⅓ to ½ of the total length L of said separation modules from said first ends of said separation modules.

8. The modular liquid/liquid gravity separation device according to claim 1, wherein said separation module includes mechanical reinforcing elements providing a rigid connection between said delivery pipe and said separation pipe(s).

9. The modular liquid/liquid gravity separation device according to claim 1, including a branch pipe from said upper second outlet orifice or from said first removal pipe, and/or a branch pipe from said lower second outlet orifice or said second removal pipe so as to transfer into a said undersea feed pipe resting on the sea bottom and feeding said first cylindrical manifold tank a fraction of the liquid leaving said upper second outlet orifice or respectively said lower second outlet orifice.

10. The modular liquid/liquid gravity separation device according to claim 1, wherein said first base cooperates with first actuators suitable for adjusting the horizontal position or the angle of inclination of said separation modules relative to the horizontal, and/or said second base co-operates with second actuators suitable for adjusting the horizontal position or the angle of inclination of said separation modules and/or the horizontal position or the angle of inclination of said first and second cylindrical manifold tanks relative to the horizontal.

11. A method of using a modular liquid/liquid gravity separation device according to claim 1, wherein the oil phase and the aqueous phase of a crude oil which may contain sand, are separated by performing the following successive steps:
　1) feeding crude oil to said first cylindrical manifold tank from at least one said undersea feed pipe resting on the sea bottom, which crude oil comes from a well in the sea bottom, said pipe resting on the sea bottom being connected to a said first inlet orifice of said first cylindrical manifold tank;
　2) causing said crude oil to flow from said first cylindrical manifold tank to said delivery pipe;
　3) separating an upper oil phase and a lower aqueous phase, possibly containing sand, by causing said crude oil to flow within each said separation module;
　4) removing the two-phase fluid leaving each said separation pipe via a said second inlet orifice of said second cylindrical manifold tank;
　5) removing said oil phase from at least one said upper second outlet orifice via at least one said first removal pipe, with the help of a said first export pump; and
　6) removing said aqueous phase from at least one said lower second outlet orifice via at least one second removal pipe with the help of a said second export pump.

12. The method of use according to claim 11, wherein use is made of a modular liquid/liquid separation device in which at least one said first outlet orifice and at least one said second inlet orifice that are suitable for being connected to a common separation module are closed and not connected to a said separation module, wherein after performing the steps 1) to 6), the following successive steps are performed:
　7.1) adding a said separation module that is lowered from the surface and that has said second ends of said delivery pipe and respectively of said separation pipe coupled to said unoccupied first outlet orifice and respectively to said unoccupied second inlet orifice; and then
　8.1) opening said closure valves of said first outlet orifice and of said second inlet orifice.

13. The method of use according to claim 11, wherein use is made of a modular liquid/liquid gravity separation device having more than two separation modules, wherein after performing the steps 1) to 6), the following successive steps are performed:
　7.2) closing said closure valves of a first said outlet orifice and of at least one second said inlet orifice coupled to a common separation module, and
　8.2) separating said separation module coupled to said first outlet orifice and said second inlet orifice having their valves closed, and then raising said separated separation module to the surface.

14. The method of use according to claim 11, wherein in steps 5) and/or 6), a fraction of the liquid removed from said upper second outlet orifice and/or respectively from said lower second outlet orifice is taken and reinjected into said feed undersea pipe for mixing said liquid fraction with the feed crude oil, thereby modifying the water cut of the crude oil entering in said modular separation device.

15. The method of use according to claim 11, wherein after performing separation in accordance with steps 1) to 6), at least one separation module is cleaned in order to remove any sand that might be deposited on the bottom of its said separation pipe, the cleaning being performed by implementing the following successive steps:
　7.3) opening said closure valves of said first outlet orifices and/or said second inlet orifices of the separation module(s) for cleaning and closing the closure valves of said first outlet orifices and/or of said second inlet orifices to which the other separation modules are connected, which other modules are greater in number than the separation modules for cleaning;
　8.3) causing said crude oil to flow at an accelerated rate exclusively within said separation module(s) for cleaning; and
　9.3) sending to the surface via said upper second outlet orifice all of the fluid leaving said second tank, said second export pump co-operating with said lower second outlet orifice not being activated.

16. A method of installing a modular liquid/liquid gravity separation device according to claim 11 on the sea bottom, wherein the following steps are performed:
　1) lowering a said common manifold device from the surface and placing it on a said second base anchored to the sea bottom, and coupling said first inlet orifice and said upper and lower second outlet orifices to said first and second removal pipes; and
　2) lowering a said separation module from the surface and placing it on a first base anchored to the sea bottom, and coupling said second ends of said feed pipe and of said separation pipe with said first outlet orifices and respectively with said second inlet orifices of said common manifold device.

17. The method of use according to claim 11, wherein:
　in step 1) said crude oil has been degassed in full or in part in a liquid/gas separator device;
　in step 5), said oil phase is removed to a support floating on the surface; and
　in step 6), said aqueous phase is removed to a well in the sea bottom into which the water of said aqueous phase is re-injected.

18. The modular liquid/liquid gravity separation device according to claim 1, wherein said modular separation device rests on the sea bottom at a depth of at least 1000 m.

19. The modular liquid/liquid gravity separation device according to claim 1, comprising a plurality of n separation modules, n being an integer in the range of 5-10.

20. The modular liquid/liquid gravity separation device according to claim 1, wherein said cylindrical manifold tank extends in an axial longitudinal direction $Y_1Y_1$ perpendicular to the axial longitudinal direction $X_1X_1$ of said delivery pipe.

21. The modular liquid/liquid gravity separation device according to claim 9, wherein said liquid fraction is transferred via a mixer situated at the level of said undersea feed pipe resting on the sea bottom.

* * * * *